United States Patent
Ohta

(10) Patent No.: US 7,619,960 B2
(45) Date of Patent: Nov. 17, 2009

(54) OPTICAL PICKUP DEVICE

(75) Inventor: Keisuke Ohta, Mihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 616 days.

(21) Appl. No.: 11/404,245

(22) Filed: Apr. 14, 2006

(65) Prior Publication Data

US 2006/0233081 A1    Oct. 19, 2006

(30) Foreign Application Priority Data

Apr. 15, 2005  (JP)  .............................. 2005-118548
Mar. 8, 2006   (JP)  .............................. 2006-062767

(51) Int. Cl.
*G11B 7/00*    (2006.01)
(52) U.S. Cl. ..................... 369/112.28; 369/112.29; 369/112.05; 369/53.26
(58) Field of Classification Search ............. 369/53.26, 369/44.24, 44.14, 44.37, 44.19, 116, 112.21, 369/112.28, 112.01, 112.09
See application file for complete search history.

(56) References Cited

U.S. PATENT DOCUMENTS 4,626,679 A * 12/1986 Kuwayama et al. ...... 369/44.19
4,989,198 A *  1/1991 Kojima et al. ............ 369/116
5,095,472 A *  3/1992 Uchino et al. ............ 369/44.14
7,023,787 B2 *  4/2006 Katayama ............... 369/112.01
2004/0095871 A1 *  5/2004 Shindo .................. 369/112.21

FOREIGN PATENT DOCUMENTS

| JP | 09-159830 A | 6/1997 |
| JP | 11-273119 A | 10/1999 |
| JP | 2001-052368 A | 2/2001 |
| JP | 2002-092929 A | 3/2002 |

* cited by examiner

*Primary Examiner*—Hoa T Nguyen
*Assistant Examiner*—Kim-Kwok Chu
(74) *Attorney, Agent, or Firm*—Morrison & Foerster LLP

(57) ABSTRACT

An optical pickup device using a laser beam comprising: a light-emitting element; a collimating lens; an objective lens; and a light-receiving element, wherein the laser beam emitted from the light-emitting element is converged on a recording surface of an optical disc to be disposed through a path related to the collimating lens and the objective lens, and the converged laser beam is entered to the light-receiving element reversely passing through the path after being reflected on the recording surface of the optical disc, the optical pickup device comprising: a front monitor light-receiving element for receiving a part of the laser beam emitted from the light-emitting element and detecting the amount of the laser beam; and an optical guiding member for guiding a part of the laser beam to the front monitor light-receiving element.

8 Claims, 6 Drawing Sheets

OUTPUT INTENSITY DISTRIBUTION FROM SEMICONDUCTOR LASER

OPTICAL PICKUP DEVICE

CROSS-REFERENCE TO RELATED APPLICATION

This application is related to Japanese Patent Applications No. 2005-118548 filed on Apr. 15, 2005, and No. 2006-062767 filed on Mar. 8, 2006 whose priorities are claimed and the disclosure of which is incorporated by reference in its entirety.

BACKGROUND OF THE INVENTION

1. Field of the Invention

The present invention relates to an optical pickup device capable of performing at least one of reproduction, recording and erasing of information with respect to an optical disc (optical information recording medium) represented by a compact disc (referred to as CD) and digital versatile disc (referred to as DVD), and, more particularly, relates to an optical pickup device which controls an output of a laser beam using a front monitor light-receiving element.

2. Description of the Related Art

FIG. 8 is a schematic configuration diagram of a conventional optical pickup device using light receiving and emitting integral-type elements 1a and 1b in which a light-emitting element and a light-receiving element are integrated. In this optical pickup device, a laser beam emitted from each of the light receiving and emitting integral-type elements 1a and 1b and having an approximately horizontal optical axis 100 is transmitted or reflected by a beam splitter 12. The transmitted or reflected laser beam is collimated to a parallel beam by a collimator lens 13 and then, reflected by a raising mirror 14 approximately at a right angle to the upper portion where an objective lens 15 is disposed. The reflected laser beam is transmitted through the objective lens 15 and converged on a recording surface of a substantially horizontally disposed optical disc 16.

The converged laser beam is reflected on the recording surface of the optical disc 16 and entered to each of the light receiving and emitting integral-type elements 1a and 1b via a reverse path to a forward path. This laser beam is then guided to a light-receiving surface by a diffraction grating (not shown in the drawing) provided on each of the light receiving and emitting integral-type elements 1a and 1b. Then, an electric signal is detected according to the amount of the laser beam received by the light-receiving surface.

In such an optical pickup device, a part of the laser beam emitted from each of the light receiving and emitting integral-type elements 1a and 1b is entered to a front monitor light-receiving element 17 disposed substantially horizontally (that is, substantially parallel to the optical axis 100) in the vicinity of the beam splitter 12.

As shown in a FIG. 9, the front monitor light-receiving element 17 includes a substrate portion 50, a light-receiving portion 51 fixed to a lower surface of the substrate portion 50, and a transparent resin mold portion 52 sealing the light-receiving portion 51 to retain at a fixed position; and a light-receiving surface (lower surface) of the light-receiving portion 51 is disposed so as to be substantially parallel to the optical axis 100. The front monitor light-receiving element 17 outputs an electrical signal according to the amount of the laser beam entered to the light-receiving surface of the light-receiving portion 51 and controls the output of the light receiving and emitting integral-type elements 1a and 1b with an automatic power control (APC) circuit so that the laser beam to be converged on the optical disc 16 becomes appropriate intensity.

Other prior technology related the optical pickup device is disclosed in, for example, Japanese Unexamined Patent Publication Nos. 2001-52368, 2002-92929, HEI09(1997)-159830, and HEI11(1999)-273119.

The optical pickup device shown in FIG. 8 and FIG. 9 is configured so that the laser beam is received by the front monitor light-receiving element 17 in which the light-receiving surface is substantially parallel to the optical axis 100 of the laser beam to monitor the laser beam output. This provides a significant advantage in that thickness in a direction (Y-axis direction) substantially perpendicular to the optical axis 100 of the laser beam in the optical pickup device can be thinner, as compared with the case where the light-receiving surface is disposed substantially perpendicular to the optical axis.

In such a configured optical pickup device, however, the light-receiving surface of the light-receiving portion 51 of the front monitor light-receiving element 17 is disposed substantially parallel to the optical axis 100 and the amount of laser beam entered to the front monitor light-receiving element 17 is not sufficient; and therefore, a control gain of the APC circuit needs to be increased. Whereas, when the control gain is increased, the responsiveness of the APC circuit is reduced. Consequently, the optical pickup device cannot correspond to high speed reproducing and recording information from and to the optical disc represented by a CD and DVD, and the optical pickup device may possibly be considerably degraded.

Furthermore, in such a configured optical pickup device, an incident angle θ of the laser beam to the front monitor light-receiving element 17 becomes large, as shown in FIG. 8. That is, output intensity distribution from a semiconductor laser is ellipse shape having a long axis in the Y-axis direction, a part of which is received by the front monitor light-receiving element 17; and the incident angle θ becomes large. Then, if an oscillation wavelength of the laser beam is changed, reflectivity on the surface of the front monitor light-receiving element 17 considerably fluctuates even if the incident angle θ is constant. Material of the front monitor light-receiving element 17 is semiconductor and wavelength dependence property of index of refraction is large. Therefore, there is a problem in that the output of the front monitor light-receiving element 17 changes even if the laser beam output is constant.

More specific explanation is as follows.

First, as well known, the relationship between the incident angle and the reflectivity is that the incident angle θ rapidly increases when exceeding approximately the so-called Brewster angle $\theta_B$, where $$\theta_B = \operatorname{Tan}^{-1} n$$

(n is a relative index of refraction of a transmission side medium to an incident side medium; here, n is an index of refraction of the front monitor light-receiving element 17; for example, $\theta_B$ becomes 76 degrees when n is 4). That is, incident angle dependence property of the reflectivity becomes precipitous on reaching the Brewster angle $\theta_B$.

Meanwhile, when the index of refraction changes, the Brewster angle $\theta_B$ changes and therefore dependence property of the incident angle (θ) of the reflectivity (R) shown in FIG. 10 changes from a curve 1 to a curve 3 via a curve 2. As a result, even if the incident angle θ is constant, the reflectivity at the surface of the front monitor light-receiving element 17 fluctuates. Then, the incident angle (θ) dependence property of the reflectivity (R) becomes remarkable at such a large angle that the incident angle θ exceeds the Brewster angle $\theta_B$.

Then, in the case of a semiconductor laser, the oscillation wavelength changes largely by an ambient temperature or temperature change due to self-heating and therefore fluctuation of the aforementioned reflectivity is a serious problem. Consequently, the laser beam needs to be entered to the front monitor light-receiving element 17 as vertically as possible without increasing the size of the device.

SUMMARY OF THE INVENTION

It is an object of the present invention to provide an optical pickup device capable of increasing the amount of laser beam to be entered to a light-receiving surface of a front monitor light-receiving element, as compared with a conventional optical pickup device.

According to the present invention, there is provided an optical pickup device using a laser beam comprising: a light-emitting element; a collimating lens; an objective lens; and a light-receiving element, wherein the laser beam emitted from said light-emitting element is converged on a recording surface of an optical disc to be disposed through a path related to said collimating lens and said objective lens, and the converged laser beam is entered to said light-receiving element reversely passing through said path after being reflected on the recording surface of the optical disc, said optical pickup device comprising: a front monitor light-receiving element for receiving a part of the laser beam emitted from said light-emitting element and detecting the amount of the laser beam; and an optical guiding member for guiding a part of the laser beam to said front monitor light-receiving element.

According to the present invention, the optical pickup device includes a front monitor light-receiving element for receiving a part of the laser beam emitted from the light-emitting element and detecting the amount of the laser beam; and an optical guiding member for guiding a part of the laser beam to the front monitor light-receiving element, whereby the amount of the laser beam to be entered to the light-receiving surface of the front monitor light-receiving element can be increased, as compared with the conventional optical pickup device. Consequently, it is possible to stably perform control of laser output of the optical pickup device, and the optical disc represented by a CD and DVD can be reproduced, recorded, or erased at a high speed, as compared with the conventional optical disc.

DETAILED DESCRIPTION OF THE PREFERRED EMBODIMENTS

Figure 1:
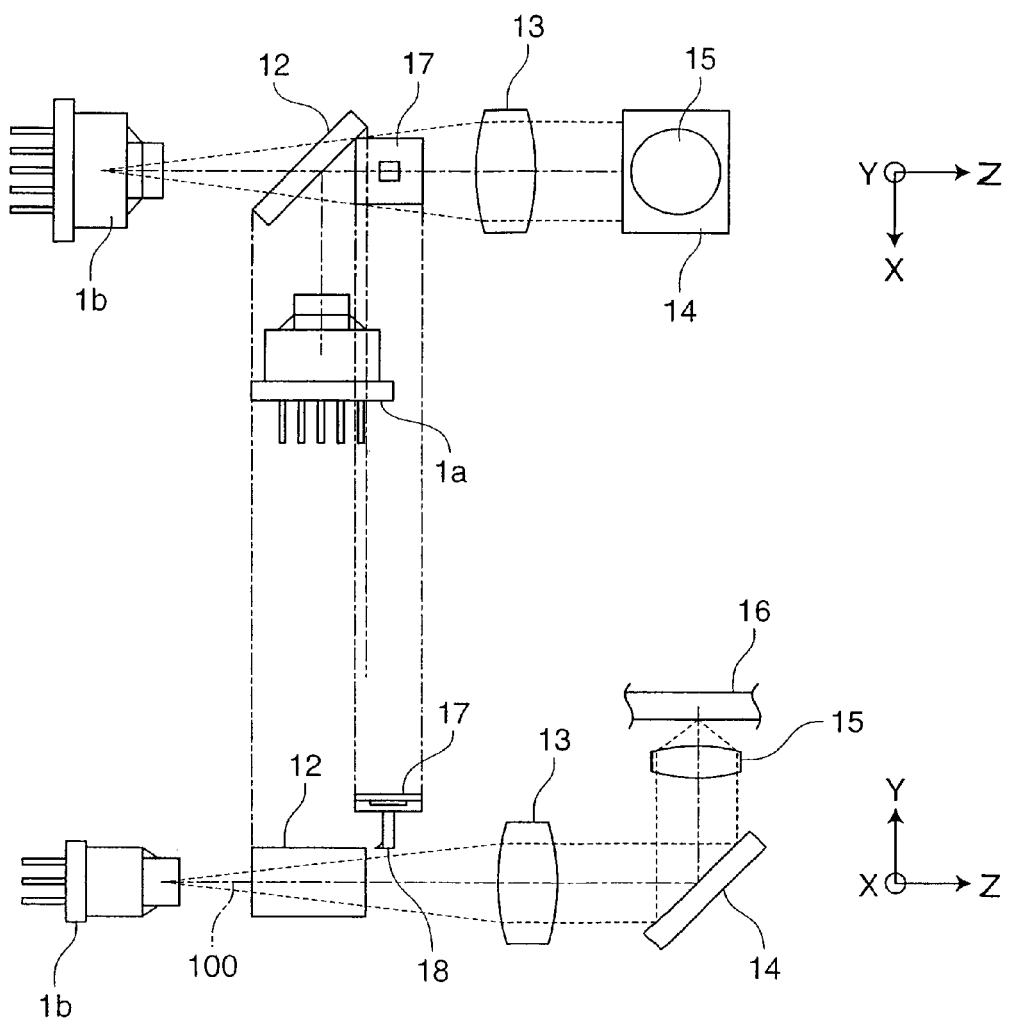
FIG. 1 shows a schematic configuration of a horizontal arrangement type optical pickup device according to a first embodiment of the present invention.

The optical pickup device according to the present invention may include a horizontal arrangement type device in which the optical disc is disposed substantially parallel to a horizontal plane; a vertical arrangement type device in which the optical disc is disposed substantially perpendicular to the horizontal plane; or a device in which the optical disc is disposed at any angle to the horizontal plane. Furthermore, the light-emitting element and the light-receiving element may be separately disposed; or the light-emitting element and the light-receiving element may be integrated as the light receiving and emitting integral-type element.

For example, the optical pickup device of the present invention may be configured as follows. The laser beam emitted from the light-emitting element or the light receiving and emitting integral-type element and having an optical axis substantially horizontal to a plane including a shaft is reflected by a beam splitter or collimated by a collimating lens after transmitting through the beam splitter. Subsequently, the laser beam is reflected by a raising mirror at a substantially right angle to the upper portion where an objective lens is disposed and converged on the recording surface of the optical disc after transmitting through the objective lens. The converged laser beam is reflected on the recording surface of the optical disc and then transmitted through the beam splitter via a reverse path or reflected by the beam splitter. After that, the laser beam is entered to the light-receiving element or returned to the light receiving and emitting integral-type element via the reverse path. Further, the front monitor light-receiving element, which receives a part of the light emitted from the light-emitting element or the light receiving and emitting integral-type element, is disposed substantially parallel to the plane including the optical axis or a plurality of the optical axes of the laser beam emitted from the light-emitting element or the light receiving and emitting integral-type element.

The front monitor light-receiving element, for example, may be disposed between the light-emitting element or the light receiving and emitting integral-type element and the collimating lens, substantially parallel to an optical axis passing through the light-emitting element or the light receiving and emitting integral-type element and the collimating lens. The optical guiding member may be disposed so as to be in contact with a light-receiving surface of the front monitor light-receiving element or so as to be separated from the light-receiving surface by a certain distance.

As for an example of the optical guiding member, there may be provided a paraboloid mirror which receives a part of the laser beam emitted from the light-emitting element or the light receiving and emitting integral-type element and bends the received laser beam toward a predetermined direction to guide to the front monitor light-receiving element; or one which includes such a paraboloid mirror and a holding body for retaining the paraboloid mirror.

According to the optical guiding member provided with such a paraboloid mirror, a part of the laser beam emitted from the light-emitting element or the light receiving and emitting integral-type element can be more entered to the light-receiving surface of the front monitor light-receiving element by the paraboloid mirror, as compared with the conventional optical pickup device.

As for another example of the optical guiding member, there may be included an optical fiber which receives a part of the laser beam emitted from the light-emitting element or the light receiving and emitting integral-type element and bends the received laser beam toward a predetermined direction to guide to the front monitor light-receiving element; or one which includes such an optical fiber and a holding body for retaining the optical fiber.

According to the optical guiding member provide with such an optical fiber, a part of the laser beam emitted from the light-emitting element or the light receiving and emitting integral-type element can be more entered to the light-receiving surface of the front monitor light-receiving element by the paraboloid mirror, as compared with the conventional optical pickup device.

As for other example of the optical guiding member, there may be included a triangular prism whose transverse section shape is a right angle triangle; in which one of two side surfaces which sandwich the right angle of the triangular prism serves as an incident surface of the laser beam and an inclined surface facing to the right angle serves as a reflecting surface; and which receives a part of the laser beam emitted from the light-emitting element or the light receiving and emitting integral-type element, and guides the received laser beam to the front monitor light-receiving element. It may be also one which includes such a triangular prism and a holding body for retaining the triangular prism.

According to the optical guiding member provided with such a triangular prism, a part of the laser beam emitted from the light-emitting element or the light receiving and emitting integral-type element can be more entered to the light-receiving surface of the front monitor light-receiving element by the reflection at the inclined surface of the prism, as compared with the conventional optical pickup device.

Now, several embodiments of the present invention will be described with reference to the accompanying drawings only for exemplary purposes.

First Embodiment

FIG. 1 is a schematic configuration diagram of a horizontal arrangement type optical pickup device using two light receiving and emitting integral-type elements 1a and 1b according to a first embodiment of the present invention. A laser beam emitted from each of the light receiving and emitting integral-type elements 1a and 1b, in which a light-emitting element and a light-receiving element are integrated, and having an approximately horizontal (parallel to the z-axis) optical axis 100 is transmitted or reflected by a beam splitter 12. The transmitted or reflected laser beam is collimated to a parallel beam by a collimator lens 13 and then reflected by a raising mirror 14 approximately at a right angle to the upper portion where an objective lens 15 is disposed. The reflected laser beam is transmitted through the objective lens 15 and converged on a recording surface of a substantially horizontally disposed optical disc 16.

The converged laser beam is reflected on the recording surface of the optical disc 16 and returned to each of the light receiving and emitting integral-type elements 1a and 1b via a reverse path to a forward path. The laser beam is then guided to a light-receiving surface by a diffraction grating (not shown in the drawing) provided on each of the light receiving and emitting integral-type elements 1a and 1b. Then, an electric signal is detected according to the amount of the laser beam received by the light-receiving surface.

In this optical pickup device, a front monitor light-receiving element 17 which directly receives a part of the laser beam emitted from the light receiving and emitting integral-type elements 1a and 1b is disposed between the beam splitter 12 and the collimator lens 13. The front monitor light-receiving element 17 outputs an electrical signal according to the amount of the received laser beam and controls the output of the light receiving and emitting integral-type elements 1a and 1b with an automatic power control (referred to as APC) circuit so that the laser beam converged on the optical disc 16 becomes appropriate intensity.

Figure 2:
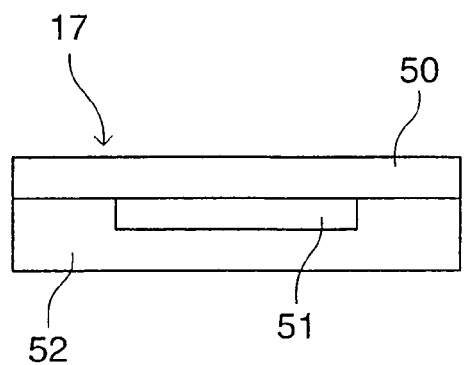
FIG. 2 is a partially enlarged view of the optical pickup device shown in FIG. 1.

As shown in FIG. 1 and FIG. 2, the front monitor light-receiving element 17 includes a substrate portion 50 having above and below surfaces (internal and external surfaces), both surfaces being parallel each other; a tabular light-receiving portion 51 fixed to a lower surface (internal surface) of the substrate portion 50; and a transparent resin mold portion 52 for retaining the light-receiving portion 51 in place. The front monitor light-receiving element 17 is disposed so that the substrate portion 50 and the light-receiving surface (lower surface) of the light-receiving portion 51 are substantially parallel to the optical axis 100, that is, substantially parallel to substantially horizontal plane (the X-Z surface).

Figure 3:
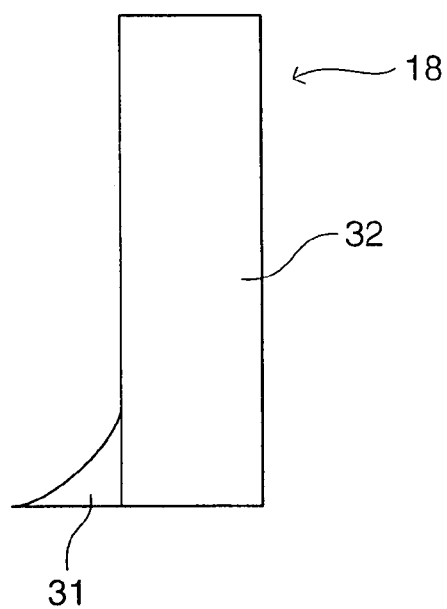
FIG. 3 is a partially enlarged view of the optical pickup device shown in FIG. 1.

As shown in FIG. 1 and FIG. 3, this optical pickup device further includes an optical guiding member 18. The optical guiding member 18 is disposed so as be in contact with the light-receiving surface of the light-receiving portion 51 of the front monitor light-receiving element 17 and protruded downward therefrom. The optical guiding member 18 guides a part of the laser beam emitted from the light receiving and emitting integral-type elements 1a and 1b to the light-receiving surface of the light-receiving portion 51 of the front monitor light-receiving element 17. That is, the optical guiding member 18 includes a paraboloid mirror 31, which receives a part of the laser beam emitted from each of the light receiving and emitting integral-type elements 1a and 1b and bends it to guide to the light-receiving surface of the light-receiving portion 51 of the front monitor light-receiving element 17, and a holding body 32 for retaining the paraboloid mirror 31.

In the optical pickup device according to the first embodiment, a part of the laser beam emitted from each of the light receiving and emitting integral-type elements 1a and 1b can be more entered to the light-receiving surface of the light-receiving portion 51 of the front monitor light-receiving element 17 by the paraboloid mirror 31 of the optical guiding member 18, as compared with the conventional optical pickup device. Consequently, it is possible to stably perform control of laser output of the optical pickup device, and the optical disc 16 represented by a CD and DVD can be reproduced, recorded, or erased at a high speed.

Second Embodiment

Figure 4:
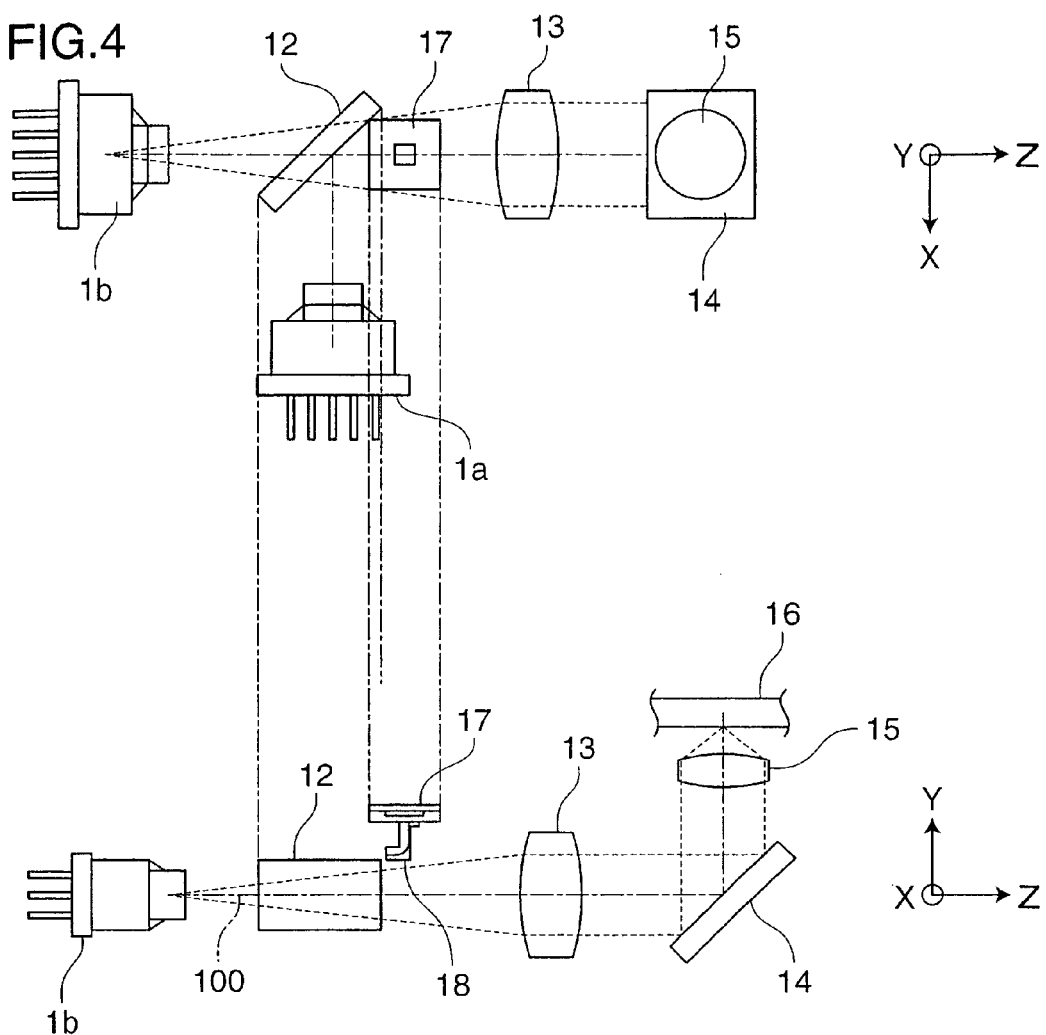
FIG. 4 shows a schematic configuration of an optical pickup device according to a second embodiment of the present invention.

FIG. 4 is a schematic configuration diagram of a horizontal arrangement type optical pickup device according to a second embodiment of the present invention, using two light receiving and emitting integral-type elements 1a and 1b. The optical pickup device includes an optical guiding member 18 for guiding a part of the laser beam emitted from the light receiving and emitting integral-type elements 1a and 1b to a front monitor light-receiving element 17.

Figure 5:
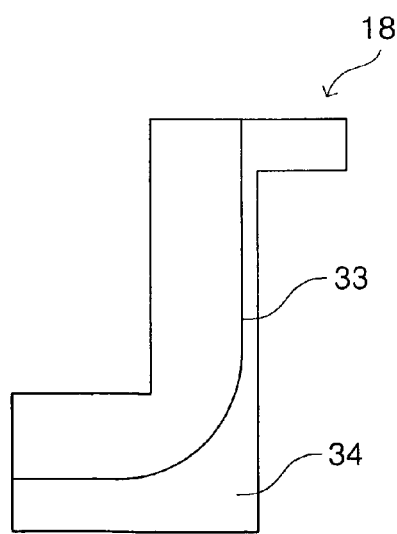
FIG. 5 is a partially enlarged view of the optical pickup device shown in FIG. 4.

The optical guiding member 18 is disposed so as be in contact with the light-receiving surface of the light-receiving portion 51 of the front monitor light-receiving element 17 and protruded downward therefrom. As shown in FIG. 5, the optical guiding member 18 includes an optical fiber 33, which receives a part of the laser beam emitted from the light receiving and emitting integral-type elements 1a and 1b from the lower side and bends the received laser beam to guide to the light-receiving surface of the light-receiving portion 51 of the front monitor light-receiving element 17, and a holding body 34 for embeddedly retaining the optical fiber 33. Other constituent elements in this optical pickup device are the same as the optical pickup device according to the first embodiment.

In the optical pickup device according to the second embodiment, a part of the laser beam emitted from the light receiving and emitting integral-type elements 1a and 1b can be more entered to the light-receiving surface of the light-receiving portion 51 of the front monitor light-receiving element 17 by the optical fiber 33 of the optical guiding member 18, as compared with the conventional optical pickup device.

Consequently, it is possible to stably perform control of laser output of the optical pickup device, and the optical disc 16 represented by a CD and DVD can be reproduced, recorded, or erased at a high speed.

Third Embodiment

Figure 6:
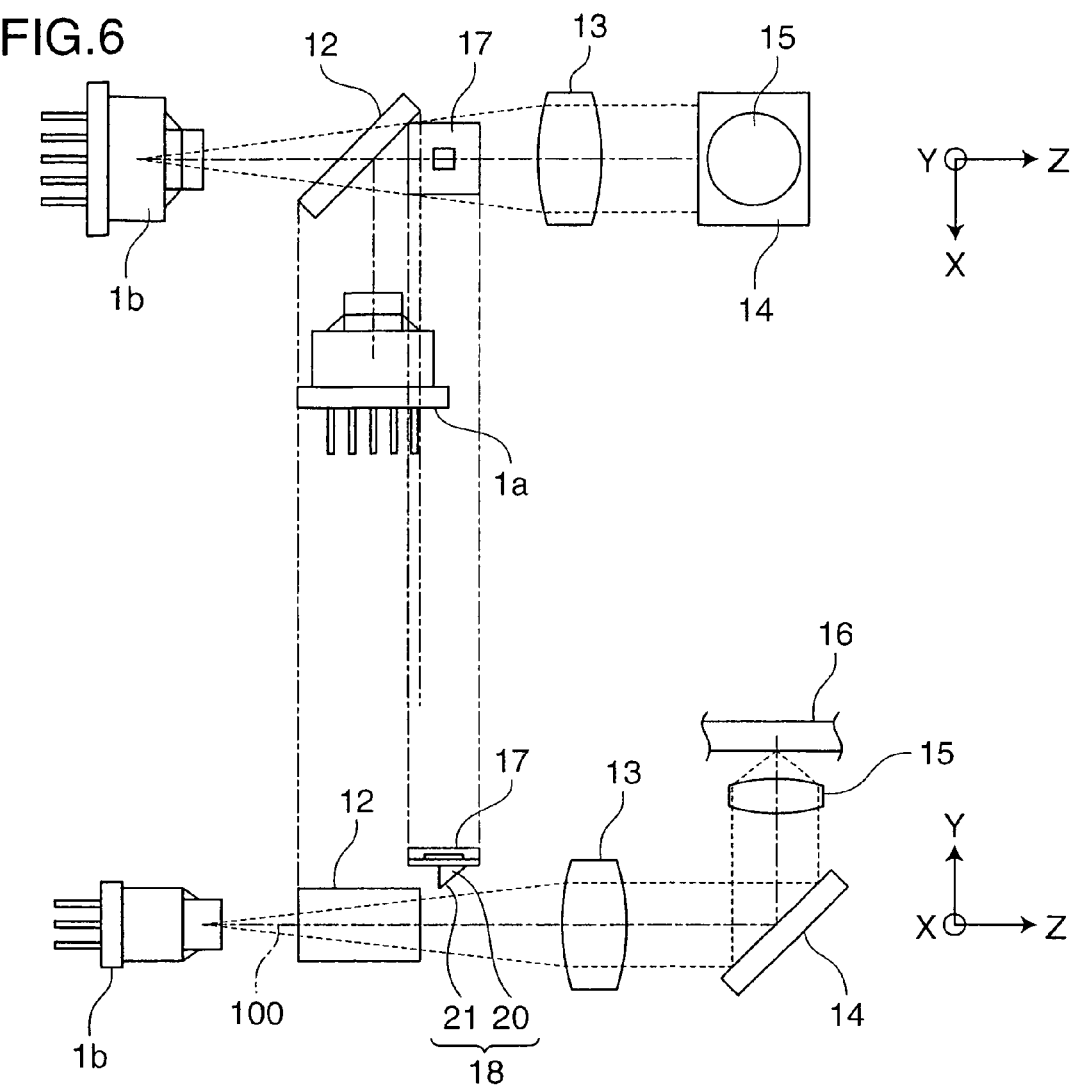
FIG. 6 shows a schematic configuration of an optical pickup device according to a third embodiment of the present invention.

FIG. 6 is a schematic configuration diagram of a horizontal arrangement type optical pickup device according to a third embodiment of the present invention, using two light receiving and emitting integral-type elements 1a and 1b. The optical pickup device includes an optical guiding member 18 for guiding a part of the laser beam emitted from the light receiving and emitting integral-type elements 1a and 1b to a front monitor light-receiving element 17.

The optical guiding member 18 is a triangular prism 20 whose transverse section shape is a right angle triangle (a vertical angle is a right angle and a base angle is 45 degrees). The prism 20 includes an inclined surface 21 facing to the right angle and two side surfaces 22 and 22 sandwitching the right angle. Then, one of the two side surfaces 22 and 22 is in contact with a light-receiving surface of the front monitor light-receiving element 17; and the other of the two side surfaces 22 and 22 is an incident surface of the laser beam. Other constituent elements in this optical pickup device are the same as the optical pickup device according to the first embodiment.

Figure 7:
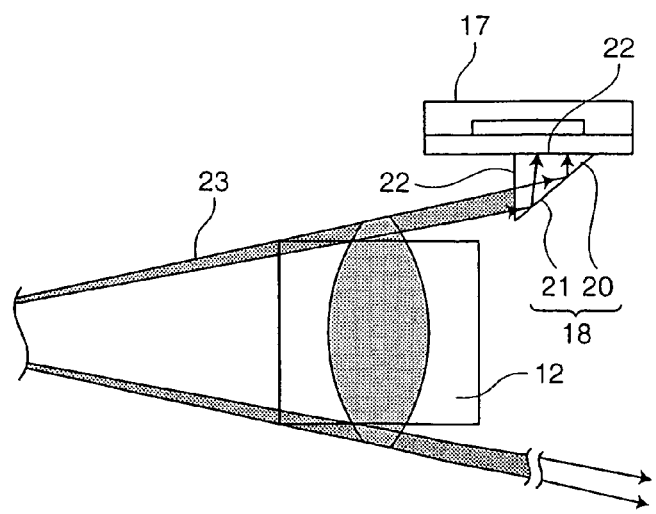
FIG. 7 is a partially enlarged view of the optical pickup device shown in FIG. 6.
Figure 8:
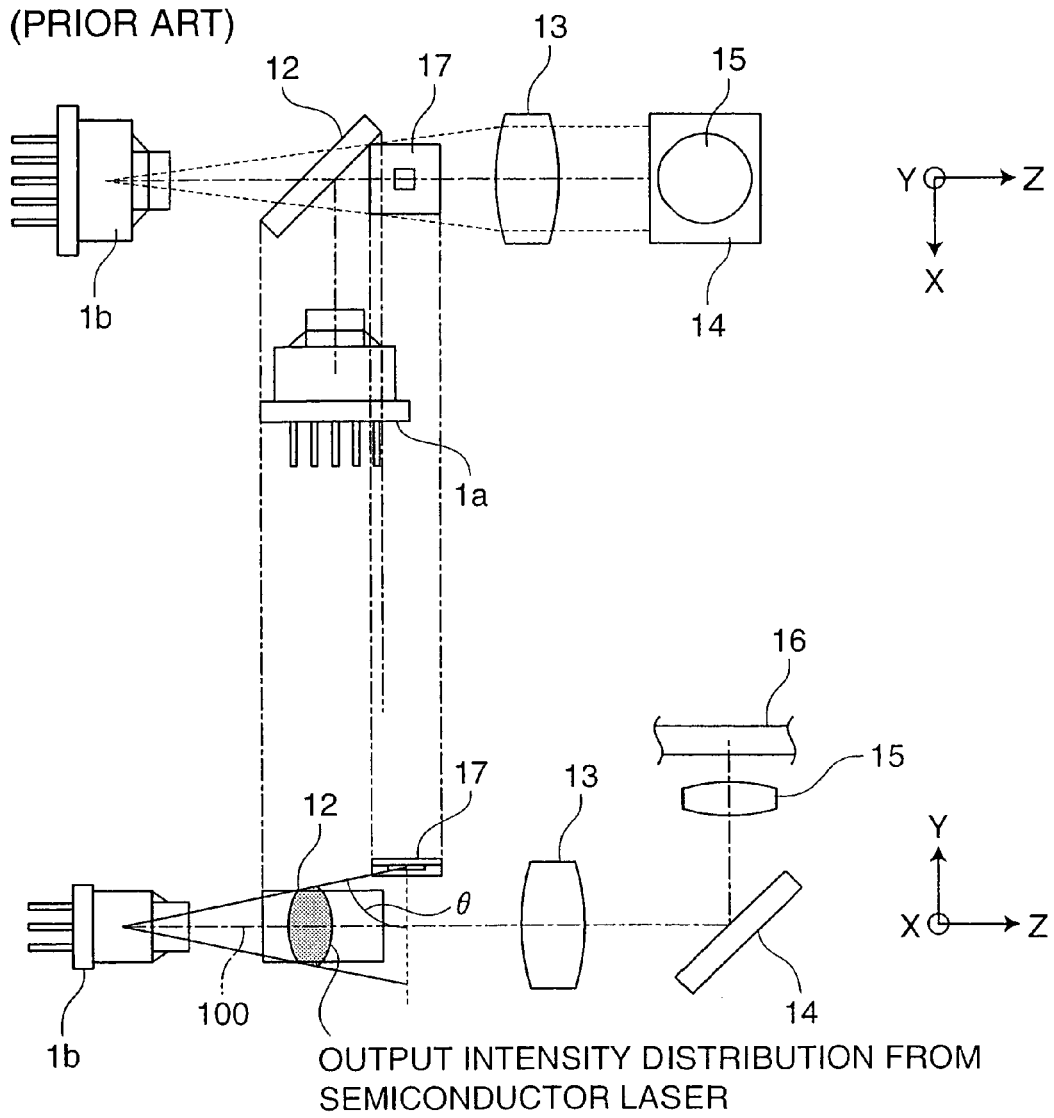
FIG. 8 shows a schematic configuration of a conventional horizontal arrangement type optical pickup device.
Figure 9:
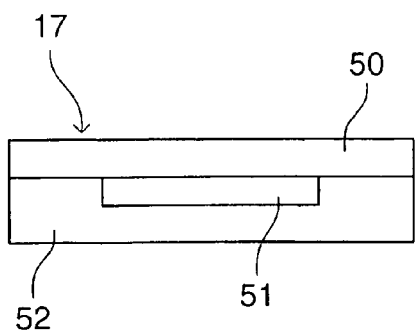
FIG. 9 is a partially enlarged view of the optical pickup device shown in FIG. 8.
Figure 10:
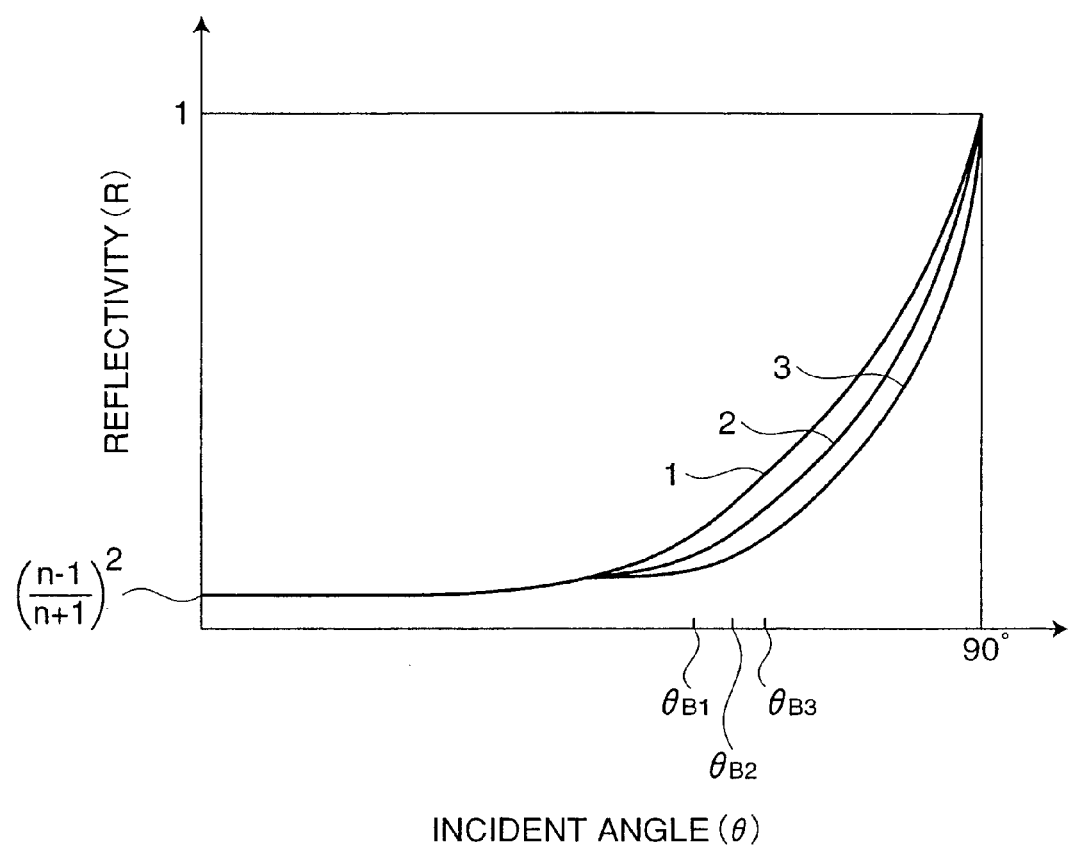
FIG. 10 is a graph for explaining a problem in the optical pickup device shown in FIG. 8.

FIG. 7 is a view for explaining optical paths of the laser beam enlarging the vicinity of the prism 20. Light entered inside the prism 20 from an incident surface 22 of the prism 20 includes light that directly enters to the front monitor light-receiving element 17 and light that reflects on the inclined surface 21. The light entered from the incident surface 22 obliquely enters to the inclined surface 21 and therefore most light is reflected to enter the front monitor light-receiving element 17, almost without loss. That is, if the prism 20 is made of general glass, its index of refraction is approximately n=1.5 and therefore the Brewster angle is $\theta_B = \text{Tan}^{-1} n = 56$ degrees.

In FIG. 7, light of an outer edge portion 23 of the laser beam slightly obliquely enters to the incident surface 22. Consequently, the angle entered to the inclined surface 21 becomes considerably large compared to the Brewster angle $\theta_B$ and reflection loss becomes small.

In this embodiment, the incident surface 22 of the prism 20 is disposed so as to be perpendicular to an optical axis of red laser beam. The reason is that, in this embodiment, a monitoring light-receiving element is incorporated inside the device and therefore infrared laser does not need to be entered to the front monitor light-receiving element 17.

However, if necessary, it is possible to configure so that both red laser and infrared laser are entered to the prism 20. It is needless to say that if a semiconductor laser device including both red laser and infrared laser contained in one package is used, intensity of the laser beam can be monitored by arrangement shown in FIG. 6.

This embodiment uses the outer edge portion 23 of the laser beam, thereby permitting to monitor by a shallower angle than a primary light diffracted by a hologram and realize further reduction in size.

The present invention can be applied to an optical pickup device capable of performing at least one of reproduction, recording, and erasing of information with respect to an optical disc represented by a CD and DVD and, more particularly, can be applied to an optical pickup device performing control of laser beam output using a front monitor light-receiving element.

What is claimed is:

1. An optical pickup device using a laser beam comprising:
a light-emitting element emitting the laser beam;
a collimating lens;
an objective lens;
a light-receiving element configured so that the laser beam emitted from said light-emitting element is converged on a recording surface of an optical disc in an incident path through said collimating lens and said objective lens, and the converged laser beam is entered to said light-receiving element reversely passing through said incident path after being reflected on the recording surface of the optical disc;
a beam splitter arranged in an optical path between the light-emitting element and the collimating lens for at least one of transmitting or reflecting the laser beam;
a front monitor light-receiving element configured to receive a part of the laser beam emitted from said light-emitting element and detecting the amount of the laser beam, wherein a light receiving surface of the front monitor light-receiving element is parallel to an optical axis passing through said light emitting element and said collimating lens; and
an optical guiding member arranged in contact with and protruding from the light-receiving surface of the front monitor light-receiving element, the optical guiding member being configured to guide a part of the laser beam to said front monitor light-receiving element.

2. The optical pickup device according to claim 1, wherein said optical disc is disposed substantially parallel to a horizontal plane.

3. The optical pickup device according to claim 1, wherein said optical disc is disposed substantially perpendicular to a horizontal plane.

4. The optical pickup device according to claim 1, wherein said light-emitting element and said light-receiving element are integrated as a light receiving and emitting integral-type element.

5. The optical pickup device according to claim 1, wherein said optical guiding member includes a paraboloid mirror receiving a part of the laser beam emitted from said light-emitting element and bending the received laser beam toward a predetermined direction to guide the laser beam to said front monitor light-receiving element.

6. The optical pickup device according to claim 1, wherein said optical guiding member includes an optical fiber receiving a part of the laser beam emitted from said light-emitting element and bending the received laser beam toward a predetermined direction to guide the laser beam to said front monitor light-receiving element.

7. The optical pickup device according to claim 1, wherein said optical guiding member comprises a prism.

8. The optical pickup device according to claim 7, wherein said prism is a triangular prism whose transverse section shape is a right angle triangle, and one of two side surfaces which sandwich the right angle of said triangular prism serves as an incident surface of the laser beam.

* * * * *